United States Patent Office 3,093,780
Patented June 11, 1963

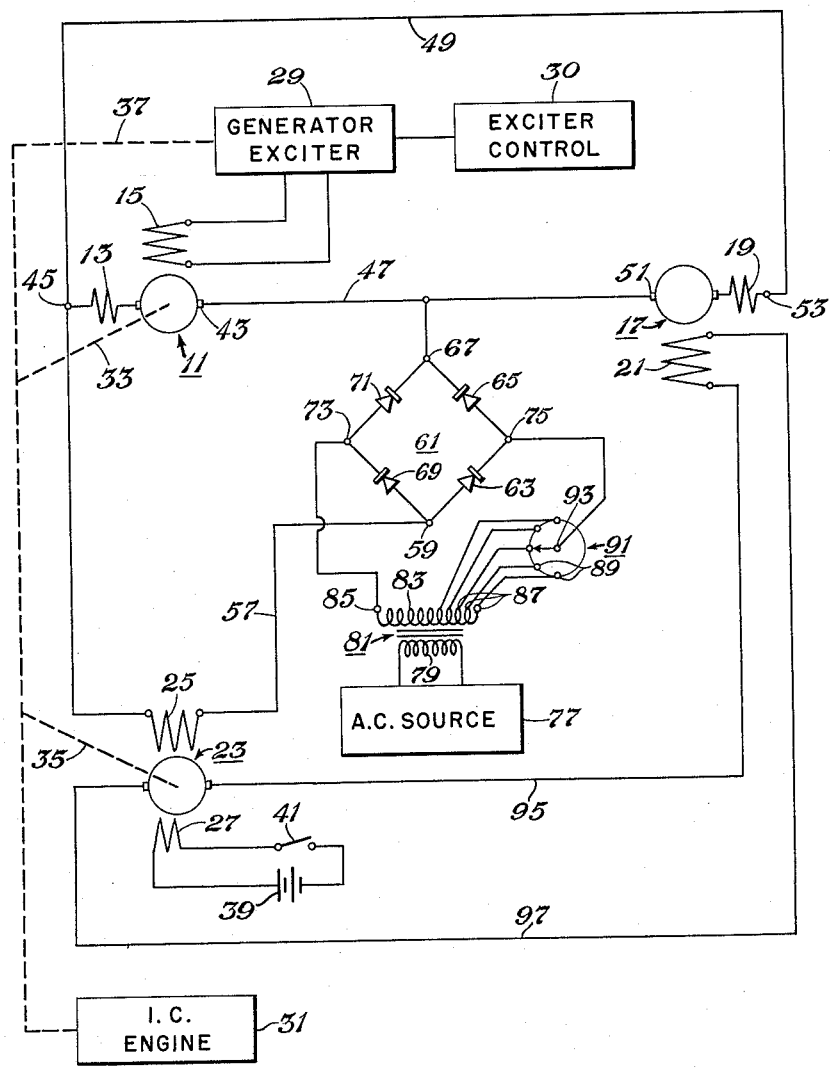

3,093,780
ELECTRIC MOTOR CONTROL SYSTEM
Robert G. LeTourneau, P.O. Box 2307, Longview, Tex.
Filed Mar. 17, 1961, Ser. No. 96,461
4 Claims. (Cl. 318—145)

My invention relates to electric motor control systems and more particularly to a system for controlling D.C. traction motors which are supplied from a generator driven by an internal combustion engine.

The invention is especially applicable to vehicles having wheels driven by electric motors which are supplied power from a generator which is in turn powered by an internal combustion engine. Many types of motor control arrangements have been devised in the prior art of which I am aware, and these for many types of applications. However, the particular type of application with which my invention in primarily concerned, though quite old in general concept, is really quite new insofar as actual practice is concerned. This general concept is that of the heavy duty type self-propelled rubber tired off-road vehicle and/or mobile self-propelled work performing machine. Machines of this general class include by way of example off-road transport vehicles, earthmoving and earthworking machines, such as scrapers, dozers, tractors and haulers, land clearing machines, logging machines, mobile cranes, and the like. It is only recently that such machines have been electrically powered to a practical commercial extent; that is, having an internal combustion engine or engines drive a generator or generators to supply electric power to vehicle wheel motors as well as to the other functions of the machine. The requirements for the electrical systems of such machines are quite severe. The electrical system of such machines must cope with wheel motor load and speed changes that are quite rapid and extend over a wide range. For example, a self-loading earthmover when picking up its load will travel very slowly with maximum wheel motor torque, but while moving the load, it will travel as fast as possible and will have a smaller wheel motor torque requirement, but a much greater wheel motor speed requirement. Thus, the wheel motors are required to work over a full range of torque and speed, with rapid changes in both. At the same time it is highly desirable that the full horsepower of the internal combustion engine should be utilized to the best advantage all of the time.

The present invention is concerned with an improved system for controlling the excitation of wheel motors of vehicles in the general class above-mentioned. The invention contemplates a system wherein a separately excited differential compound direct current generator is driven by an internal combustion engine and supplies power to electric wheel motors which are of the separately excited cumulative compound direct current type. The wheel motor shunt fields are supplied from an exciter which has its shunt field connected in series with a rectifier bridge across the generator output terminals. A source of constant alternating current voltage is connected to the rectifier bridge in bucking relation to the generator output voltage. The voltage of the alternating current source may be chosen such that at light or no generator load, it is entirely bucked out by the generator output voltage so the motor exciter main shunt field is reduced to zero. However, the motor exciter is preferably provided with a pilot shunt field from a separate source so that the exciter field is never completely lost. As the generator load increases, its output voltage decreases, so that as the generator load increases, the motor exciter field increases, increasing the wheel motor shunt fields. Thus, the wheel motor shunt fields are caused to vary as a function of the generator load and in a predetermined relationship. The present invention, in addition to the foregoing also contemplates in some cases the provision of machine operator controllable means for selecting different values of alternating current voltage to supply in bucking relationship to the generator output voltage.

Additional objects and advantages are effected by my invention as will be apparent from the following description taken in accordance with the accompanying drawing, forming a part of this application, in which:

The single FIGURE is a schematic circuit diagram illustrating the control system in accordance with a preferred embodiment of the invention.

In the drawing there is shown a differential compound direct current generator 11 having a series field 13 and a shunt field 15; a cumulative compound direct current motor 17 having a series field 19 and a shunt field 21; and a motor exciter 23 having a main shunt field 25 and a pilot shunt field 27. An exciter for the generator, shown as a block 29, has its output terminals connected to supply the generator shunt field 15. The generator exciter output may be controlled by any suitable means, shown as a block 30. An internal combustion engine, shown as a block 31, drives the generator 11, the motor exciter 23, and the generator exciter 29 through respective mechanical linkages 33, 35, 37. The motor exciter pilot field is supplied from a suitable source, shown as a battery 39 in series with an off-on switch 41. The generator output terminals 43, 45 are connected via respective leads 47, 49 to motor input terminals 51, 53. Generator output terminal 45 is connected via lead 55 in series with the motor exciter main shunt field 25 and via lead 57 to a first terminal 59 of a rectifier bridge 61. The first terminal 59 of the bridge 61 is connected in series with first and second rectifiers 63, 65 to a second bridge terminal 67. The first terminal 59 is also connected in series with third and fourth rectifiers 69, 71 to the second bridge terminal 67. The rectifiers are all poled to conduct in the direction from the bridge first terminal 59 to the bridge second terminal 67. The rectifier bridge 61 also has a third terminal 73 at the junction of the third and fourth rectifiers 69, 71, and a fourth terminal 75 at the junction of the first and second rectifiers 63, 65. The rectifier bridge second terminal 67 is connected via leads 67 and 47 to the generator output terminal 43. A constant voltage alternating current source shown as a block 77 has its output connected to the primary winding 79 of a transformer 81 which has a secondary winding 83 with an end terminal 85 and a plurality of taps 87. The taps 87 are connected to respective tap terminals 89 of a selector switch 91. The selector switch common terminal 93 is connected to rectifier bridge terminal 75, while the transformer end terminal 85 is connected to rectifier bridge terminal 73. The motor exciter 23 has its armature connected via leads 95, 97 across the motor shunt field 21.

For simplification, only a single wheel motor 17 has been shown in the drawing. It will be understood of course that in an actual vehicle a plurality of wheel motors would be used (in most cases, one for each vehicle wheel), and the wheel motors would be connected in parallel, with the motor exciter 23 supplying the shunt fields 21 of all motors. It will also be understood that in an actual vehicle suitable switching and control mechanism (not shown) would be employed to take care of wheel motor reversing and vehicle dynamic braking requirements.

To aid in explanation of the operation of the control system of the present invention, assume that the internal combustion engine 31 is of the diesel type designed to deliver about 600 horsepower at optimum efficiency at around 2000 r.p.m. Assume that the engine 31 is mounted on a self-loading earthmoving machine and driving generator 11 which supplies power for four wheel motors 17. Assume that the generator no load voltage is about 600 volts. Assume also that the motor exciter pilot field 27 is such as to provide about 30 volts at the exciter output terminals when the exciter main shunt field 25 is zero. Assume that the middle of the range of the alternating current voltage applied to the rectifier bridge 61 is about 425 volts, and the selector switch 91 is set at the middle of the range. Under these conditions, when the generator 11 is at no load, or is only lightly loaded, its output voltage will completely buck out the alternating current voltage applied to the rectifier bridge 61, so that the motor exciter main shunt field 25 has no current flowing through it. As the generator loads up, its terminal voltage will drop, and in the range below 425 volts, it will buck out only a portion of the constant alternating current voltage applied to the rectifier bridge, and the remainder of this voltage will cause current to flow in the motor exciter main shunt field. The more load on the generator, the greater will be the motor exciter main shunt field excitation, and in turn, the greater will be the excitation supplied to the wheel motor shunt fields. Conversely, the lesser the generator load, the lesser the wheel motor shunt field excitation. Thus, under conditions of high torque and low speed requirement, the wheel motor shunt field excitation will be large, while for the condition of low torque and high speed requirement, the wheel motor shunt field excitation will be small. Under either condition just mentioned, the wheel motor excitation will be such as to keep the generator load as nearly constant as possible, so that the optimum horsepower and efficiency of the diesel engine will be fully utilized at all times. To put it another way, the control system of the present invention causes the vehicle wheel motors to adjust their speed proportional to the torque requirement of the moment but the wheel motor speed will always be the greatest possible when considering the available diesel engine horsepower.

The control system herein disclosed has been found in practice to be very effective in achieving the objectives of the invention as herein set forth.

While I have shown my invention in only one form, it will be obvious to those skilled in the art that it is not so limited, but is susceptible of various changes and modifications without departing from the spirit thereof.

I claim:

1. In a motor control system for an electrically powered self-propelled vehicle, a differential compound direct current generator having output terminals, a cumulative compound direct current traction motor having input terminals connected to said generator output terminals, an exciter having a shunt field and having output terminals connected to supply the shunt field of said traction motor, an internal combustion engine driving said generator and said exciter, a bridge rectifier connected in series with said exciter shunt field to said generator output terminals, a constant voltage alternating current source connected to said bridge rectifier in bucking relation to said generator output terminals, with the magnitude of said alternating current voltage being such as will reduce the said exciter shunt field to zero at light generator loads, whereby the strength of said motor shunt field will vary as a function of generator load.

2. In a motor control system for an electrically powered self-propelled vehicle, a differential compound direct current generator having output terminals, a cumulative compound direct current traction motor having input terminals connected to said generator output terminals, an exciter having a shunt field and having output terminals connected to supply the shunt field of said traction motor, an internal combustion engine driving said generator and said exciter, a bridge rectifier connected in series with said exciter shunt field to said generator output terminals, a constant voltage alternating current source connected to said bridge rectifier in bucking relation to said generator output terminals, with the magnitude of said alternating current voltage being such as will reduce the said exciter shunt field to zero at light generator loads, and operator controllable means for selecting different magnitudes of constant alternating current voltage, whereby the strength of said motor shunt field will vary as a function of generator load.

3. In a motor control system for an electrically powered self-propelled vehicle, a differential compound direct current generator having output terminals, a plurality of cumulative compound direct current traction motors having input terminals connected to said generator output terminals, an exciter having a shunt field and having output terminals connected to supply the shunt fields of said traction motors, an internal combustion engine driving said generator and said exciter at a substantially constant speed, a bridge rectifier connected in series with said exciter shunt field to said generator output terminals, a constant voltage alternating current source connected to said bridge rectifier in bucking relation to said generator output terminals, with the magnitude of said alternating current voltage being such as will reduce the said exciter shunt field to zero at light generator loads, whereby the strength of said motor shunt fields will vary as a function of generator load.

4. In a motor control system for an electrically powered self-propelled vehicle, a differential compound direct current generator having output terminals, a plurality of cumulative compound direct current traction motors having input terminals connected to said generator output terminals, an exciter having a pilot shunt field and a main shunt field and having output terminals connected to supply the shunt fields of said traction motors, an internal combustion engine driving said generator and said exciter at a substantially constant speed, a bridge rectifier connected in series with said exciter main shunt field to said generator output terminals, a constant voltage alternating current source connected to said bridge rectifier in bucking relation to said generator output terminals, with the magnitude of said alternating current voltage being such as will reduce the said exciter main shunt field to zero at light generator loads, whereby the strength of said motor shunt fields will vary as a function of generator load.

References Cited in the file of this patent

UNITED STATES PATENTS

| | | |
|---|---|---|
| 2,484,836 | King | Oct. 18, 1949 |
| 2,691,752 | Harris | Oct. 12, 1954 |